C. T. PFLUEGER AND W. L. ADAMS.
ARTIFICIAL BAIT.
APPLICATION FILED SEPT. 10, 1920.
1,418,326. Patented June 6, 1922.
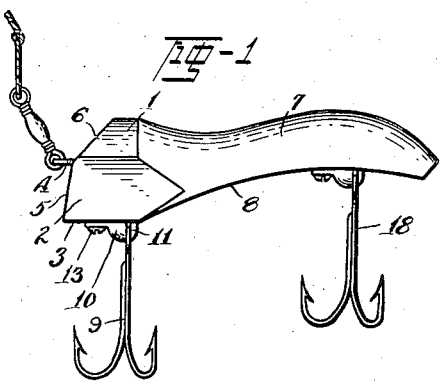
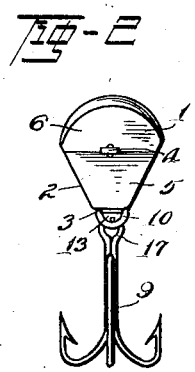
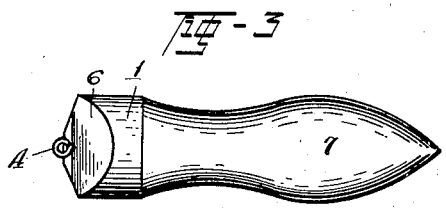
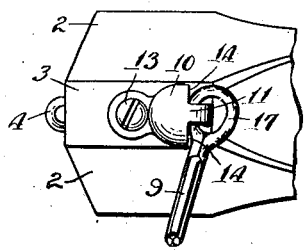
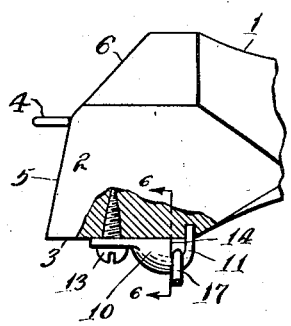
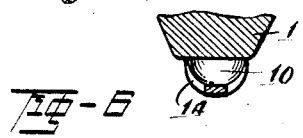
Inventors
Charles T. Pflueger &
Walter L. Adams
By Brockett & Hyde
Attys

UNITED STATES PATENT OFFICE.

CHARLES T. PFLUEGER AND WALTER L. ADAMS, OF AKRON, OHIO, ASSIGNORS TO THE ENTERPRISE MANUFACTURING COMPANY, OF AKRON, OHIO, A CORPORATION OF OHIO.

ARTIFICIAL BAIT.

1,418,326.     Specification of Letters Patent.     Patented June 6, 1922.

Original application filed August 7, 1919, Serial No. 315,870. Divided and this application filed September 10, 1920. Serial No. 409,407.

*To all whom it may concern:*

Be it known that we, CHARLES T. PFLUEGER and WALTER L. ADAMS, citizens of the United States, residing at Akron, in the county of Summit and State of Ohio, have invented certain new and useful Improvements in Artificial Bait, of which the following is a specification.

This invention relates to fishing tackle and particularly to an artificial minnow used as a bait and to hook attaching devices used therewith, this application being a division of co-pending application Serial No. 315,870, filed Aug. 7, 1919, for artificial bait.

In the specific embodiment shown the minnow comprises a body portion, having downwardly converging sides, forming a keel portion, a front end inclined upwardly backwardly in two planes and a lobe shaped tail portion with a longitudinally extending upwardly curved and transversely flat under face. The minnow is provided with a suitable hook attaching device or devices for supporting a hook or hooks and an eye, at the junction of the two inclined planes at the front end, to which the line may be attached. The invention in this particular case relates to a specific form of attaching device for the hooks.

Further features of the invention will more fully and at large appear from the following description, drawings and claims.

Referring to the drawings, Fig. 1 is a side elevation of the device; Fig. 2 is a front end elevation; Fig. 3 is a top plan view; Fig. 4 is a bottom plan view of the forward end showing the hook attaching device; Fig. 5 is a side elevation, partly in section, of the forward end of the minnow, showing the hook attaching device; and Fig. 6 is a detail section on the line 6—6, Fig. 5.

In the drawings, 1 represents the main body portion, the upper half of which is of semi-cylindrical form arched laterally and the lower half of which may be provided with downwardly converging sides 2 which meet a narrow flat bottom portion 3, as shown in Fig. 4, in substantially U-form although this is not essential. The front end of the body portion 1 is provided with a line attaching eye 4 and the front end of the body portion is inclined downwardly and forwardly to form the plane face 5 below the attaching eye, and above the attaching eye inclined rearwardly and upwardly to form the inclined face 6.

Extending to the rear of the body portion is a tail portion 7 preferably in the form of an elongated symmetrical lobe having a rounded upper portion and an upwardly extending rearwardly arched face 8 on its lower surface. This face 8 extends from the flat portion 3 to a point near the end of the tail portion. The rear end of the tail portion is pointed so as to permit the device to move freely through the water without stirring up a back wash or eddy current. The curved or arched face 8 causes the minnow to skid erratically and also keeps it on an even keel.

Below the flat portion 3 is a hook 9 secured to this flat portion by a clip comprising a hollow base 10 arched outwardly from the surface of the bait body and a hook receiving tongue 11 having its free end embedded in the material of the body portion of the minnow. The cavity in the hollow base permits entrance of the eye of a fish hook thereinto so that the hook swings more readily in its turning movements as the bait travels through the water. The clip is held in place by a screw 13 passing through an eye on the base. The hook receiving tongue 11 cooperates as a guard with the vertically disposed edges 14 of the hollow base 10, which edges are arranged in a plane substantially at right angles to the plane of the base. The device is secured to the minnow with the tongue 11 toward the rear, whereby when the eye 17 of the hook is applied thereto it is free to swing to the rear and to the sides and is prevented from swinging forward beyond the plane of the edges 14 of the guard, as shown in Fig. 4. This feature is of great importance inasmuch as it prevents, in a two hook construction, the rear hook from swinging forward and becoming entangled with the forward hook, and also prevents the forward hook from swinging to the front and becoming entangled with the line. It is obvious that this guard does not prevent the movement of the hook in all necessary directions.

Another hook 18 may be provided on the minnow and it is preferably arranged upon the flat face 8 near the rear. It may be secured in any suitable way as by one of the clips already described.

When the minnow is attached to the line and is drawn through the water it sinks to a suitable depth and wiggles about in one direction or the other and forms an alluring bait for the fish.

Having described my invention, I claim:

1. A clip for attaching fish hooks to an artificial bait, said clip comprising a hollow body portion arched outwardly from the surface to which it is attached and having a bent hook receiving tongue extending from said arched body portion towards said surface, and means for securing said clip to the surface of a fish bait.

2. A clip for attaching fish hooks to an artificial bait, said clip comprising a hollow body portion arched outwardly from the surface to which it is attached and having a bent hook receiving tongue extending from said arched body portion towards said surface, said body portion having edge portions extending transversely to said tongue and serving as stops to limit swinging motion of the hook, and means for securing said clip to a fish bait body.

3. A clip for attaching fish hooks to an artificial bait, said clip comprising a hollow body portion arched outwardly from the surface to which it is attached and having a bent hook receiving tongue extending from said arched body portion towards said surface, an eye extending from said body portion in the opposite direction from said tongue, and securing means passing through said eye into a fish bait body for securing the clip to the surface thereof.

4. A clip for attaching fish hooks to an artificial bait, said clip comprising a hollow body portion arched outwardly from the surface to which it is attached and having a bent hook receiving tongue extending from said arched body portion towards said surface, said body portion having edge portions extending transversely to said tongue and serving as stops to limit swinging motion of the hook, an eye extending from said body portion in the opposite direction from said tongue, and securing means passing through said eye into a fish bait body for securing the clip to the surface thereof.

In testimony whereof we hereby affix our signatures.

CHARLES T. PFLUEGER.
WALTER L. ADAMS.